United States Patent
Jodet et al.

(10) Patent No.: US 10,967,980 B2
(45) Date of Patent: Apr. 6, 2021

(54) TURBINE ENGINE PROPELLED AIRPLANE HAVING AN ACOUSTIC BAFFLE

(71) Applicant: SAFRAN AIRCRAFT ENGINES, Paris (FR)

(72) Inventors: Norman Bruno Andre Jodet, Maisons Alfort (FR); Jeremy Paul Francisco Gonzalez, La Chapelle Rablais (FR); Herve Rolland, Le Raincy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 372 days.

(21) Appl. No.: 15/778,415

(22) PCT Filed: Nov. 21, 2016

(86) PCT No.: PCT/FR2016/053028
§ 371 (c)(1),
(2) Date: May 23, 2018

(87) PCT Pub. No.: WO2017/089685
PCT Pub. Date: Jun. 1, 2017

(65) Prior Publication Data
US 2018/0354634 A1    Dec. 13, 2018

(30) Foreign Application Priority Data

Nov. 25, 2015  (FR) ...................................... 1561349

(51) Int. Cl.
*B64D 27/14*  (2006.01)
*B64D 27/20*  (2006.01)
(Continued)

(52) U.S. Cl.
CPC .............. *B64D 27/14* (2013.01); *B64D 27/02* (2013.01); *B64D 27/20* (2013.01); *B64D 29/04* (2013.01)

(58) Field of Classification Search
CPC ........ B64D 27/14; B64D 27/20; B64D 27/02; B64D 29/04; B64D 2033/0206; B64C 5/02
See application file for complete search history.

(56) References Cited

U.S. PATENT DOCUMENTS 8,128,023 B2 *   3/2012   Cazals ...................... B64C 5/02
                                                          244/55
8,220,739 B2 *   7/2012   Cazals ................... B64D 41/00
                                                          244/58
(Continued)

FOREIGN PATENT DOCUMENTS

FR          2 892 705 A1     5/2007
FR          2 898 583 A1     9/2007
(Continued)

OTHER PUBLICATIONS

International Search Report dated Feb. 15, 2017 in PCT/FR2016/053028 filed Nov. 21, 2016.

*Primary Examiner* — Jessica B Wong
(74) *Attorney, Agent, or Firm* — Oblon, McClelland, Maier & Neustadt, L.L.P.

(57) ABSTRACT

An airplane propelled by a turbine engine having at least one fan, the turbine engine being integrated in the rear of a fuselage of the airplane, extending it rearwards, the airplane further including at least one acoustic baffle forming panel connected to the fuselage of the airplane and arranged below the turbine engine.

9 Claims, 2 Drawing Sheets

(51) Int. Cl.
*B64D 27/02* (2006.01)
*B64D 29/04* (2006.01)

(56) References Cited

U.S. PATENT DOCUMENTS

| | | |
|---|---|---|
| 9,505,484 B1 * | 11/2016 | Al-Sabah .................. B64C 1/26 |
| 9,884,687 B2 * | 2/2018 | Marrinan ................ B64D 29/04 |
| 2008/0142641 A1 | 6/2008 | Moore et al. |
| 2008/0258005 A1 | 10/2008 | Gall et al. |
| 2009/0020643 A1 | 1/2009 | Gall et al. |
| 2012/0138736 A1 | 6/2012 | Cazals et al. |
| 2015/0291285 A1 | 10/2015 | Gallet |
| 2017/0369152 A1 * | 12/2017 | Yao ........................ B64D 27/12 |
| 2018/0134406 A1 * | 5/2018 | Reckzeh ................ B64D 27/26 |

FOREIGN PATENT DOCUMENTS

| | | | | |
|---|---|---|---|---|
| FR | 3061146 A1 * | 6/2018 | ............ | B64C 39/04 |
| WO | WO 2014/072615 A1 | 5/2014 | | |

* cited by examiner

TURBINE ENGINE PROPELLED AIRPLANE HAVING AN ACOUSTIC BAFFLE

BACKGROUND OF THE INVENTION

The present invention relates to the general field of airplanes propelled by a bypass turbine engine integrated in part in the fuselage of the airplane.

Civil airplanes are generally fitted with engines mounted under the wings or in a rear position on the fuselage, where they are secured by means of pylons.

Because of the expected increasing cost of fuel in the future, engine manufacturers are seeking to reduce the fuel consumption of civil airplanes. One of the ways that has been envisaged for achieving this is to embed the engines at least in part inside the fuselage of the airplane in order to eliminate the pylons and the fairings of the engines, thereby reducing the weight of the propulsion assembly and reducing its drag. The sound nuisance of the airplane is also limited thereby.

Furthermore, in flight, a boundary layer forms around the fuselage of the airplane and generates aerodynamic drag. Although in the past it used to be considered that engines ought not to ingest this boundary layer in order to avoid major distortion in the fan and vibration in the shafts of engines, it is now considered that absorbing a portion of the boundary layer in the engines makes it possible to reduce the aerodynamic drag of the airplane and to reduce the speed with which air is admitted into the engines, with a major improvement in propulsion efficiency.

Thus, Document WO 2014/072615 is known, which describes an airplane architecture having a turbojet integrated at the rear of the fuselage with air inlets connected to the fuselage of the airplane so as to absorb at least a portion of the boundary layer formed around the fuselage of the airplane.

That architecture presents numerous advantages. In particular it serves to reduce the aerodynamic drag of the airplane (compared with a conventional architecture having engines mounted under the wings or on a rear portion of the fuselage). In addition, since the speed of the boundary layer is low, the speed with which air is admitted into the engine and the speed with which the gas stream therefrom is ejected are reduced, thereby making it possible to achieve high propulsive efficiency and low acoustic nuisance.

Nevertheless, architecture with a turbine engine integrated in the fuselage still needs to comply with standards concerning acoustic certification, which standards relate not only to the noise radiated under the flight path of the airplane (during approach stages), but also to noise radiated laterally.

OBJECT AND SUMMARY OF THE INVENTION

A main object of the present invention is thus to satisfy this need by proposing an airplane having a turbine engine with one or more fans that is integrated in the rear of the fuselage of an airplane, extending it rearwards, and that is capable of complying with acoustic certification standards.

In accordance with the invention, this object is achieved by an airplane of this type further comprising at least one acoustic baffle forming panel connected to the fuselage of the airplane and arranged under the turbine engine.

The invention proposes taking advantage of the relative positioning between the turbine engine and the fuselage of the airplane to reduce the noise radiated by the turbine engine by incorporating one or more acoustic baffle forming panels so as to constitute an obstacle to soundwaves propagating towards the ground. Because of the presence of such a panel, it is thus possible to reduce the noise radiated by the turbine engine and thereby satisfy acoustic certification standards. In particular, it is possible, at all of the certification points, to reduce the radiated noise by more than 5 effective perceived noise decibels (EPNdb), which is the unit of measured used in aviation acoustic certification standards for expressing the effective level of perceived noise.

More precisely, the dimensions and the particular positioning of the panel are adjusted so as to treat mainly the noise that is radiated upstream from the turbine engine (i.e. the noise coming from interaction between at least one of the fans with the fan outlet guide vanes, and also the noise from the compressor).

Thus, in a vertical plane containing a longitudinal axis of the turbine engine, the panel preferably extends longitudinally between an upstream end and a downstream end, a straight line passing through the upstream end of the panel and a center of an air inlet of at least one fan of the turbojet forming an angle with the longitudinal axis of the turbine engine that lies in the range 30° to 80°, and a straight line passing through the downstream end of the panel and the center of the air inlet of the at least one fan of the turbine engine forming an angle with the longitudinal axis of the turbine engine lying in the range 60° to 130°.

Also advantageously, the angle formed between the straight line passing through the upstream end of the panel and the center of the air inlet of at least one fan of the turbine engine is 50°, and the angle formed between the straight line passing through the downstream end of the panel and the center of the air inlet of the at least one fan of the turbine engine is 90°.

Still advantageously, a horizontal distance between a plane in which the panel is arranged and a nacelle surrounding the fans of the turbine engine lies in the range 0.2 times to 0.5 times a diameter of said fans. Such a value presents a good compromise between disturbing the flow that feeds the fans of the turbine engine and making the panel suitable for integrating. Specifically, if the distance between the panel and the nacelle is too small, the proximity of the panels to the air inlet runs the risk of disturbing the feed to the fan. Conversely, if this distance is too great, the dimensions the panel needs to be larger (in particular in order to satisfy the parameters for the angles α and β), which makes it more complicated to secure to the fuselage of the airplane. In addition, under such circumstances, the vertical positioning of the panel runs the risk of not being compatible with the ground clearance constraints that are required for the airplane in operation (in particular when the airplane takes on a nose-up attitude during stages of takeoff and approach).

In a plane that is substantially vertical and substantially perpendicular to the longitudinal axis of the turbine engine, the panel preferably extends laterally between two lateral ends, a straight line passing through each lateral end of the panel and the center of the air inlet of the at least one fan of the turbine engine forming an angle with an axis substantially perpendicular to the longitudinal axis of the turbine engine that lies in the range 60° to 90°. Such an angle thus makes it possible to optimize the action of the panel in order to minimize soundwave propagation and satisfy as well as possible the acoustic certification standards relating to laterally radiated noise.

Under such circumstances, each lateral end of the panel may each be terminated by a respective winglet, the winglets being oriented so as to bring the panel towards the turbine engine. The presence of such winglets thus makes it possible to comply with these acoustic certification standards while limiting the lateral size of the panel.

The panel may present a shape that is symmetrical relative to a substantially vertical plane containing a longitudinal axis of the turbine engine. Under such circumstances, the panel may present a pointed profile with a tip positioned extending the longitudinal axis of the turbine engine, which makes it possible to satisfy the aerodynamic constraints inherent to the presence of such a panel.

Also preferably, in a substantially vertical plane that is substantially perpendicular to the longitudinal axis, the panel presents a right section in the form of an airplane wing. Thus, the effect of such a panel on the aerodynamic drag of the airplane can be minimized. Likewise, with the presence of such a panel, the airplane need not have a canard foil at the front (it being possible for its function to be performed by the panel).

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
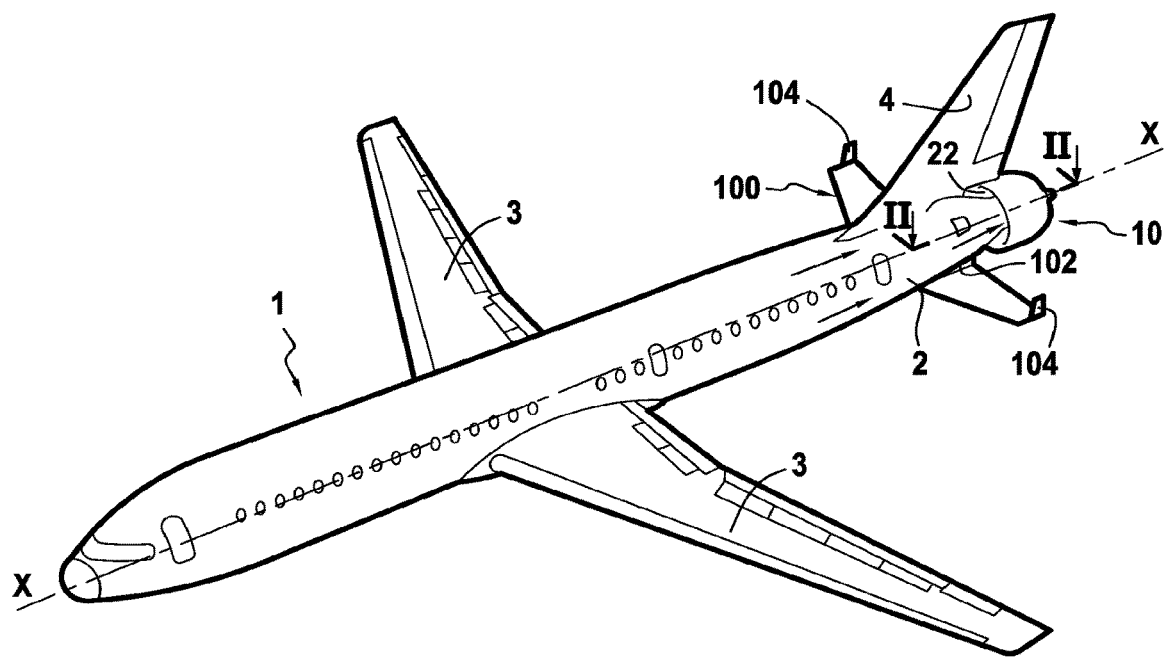
FIG. 1 is a diagrammatic perspective view of a civil airplane in accordance with the invention.

FIG. 1 shows an airplane 1 in accordance with the invention. This airplane has a turbojet 10 that is integrated in the rear of the fuselage 2 of the airplane and that extends it rearwards.

Figure 2:
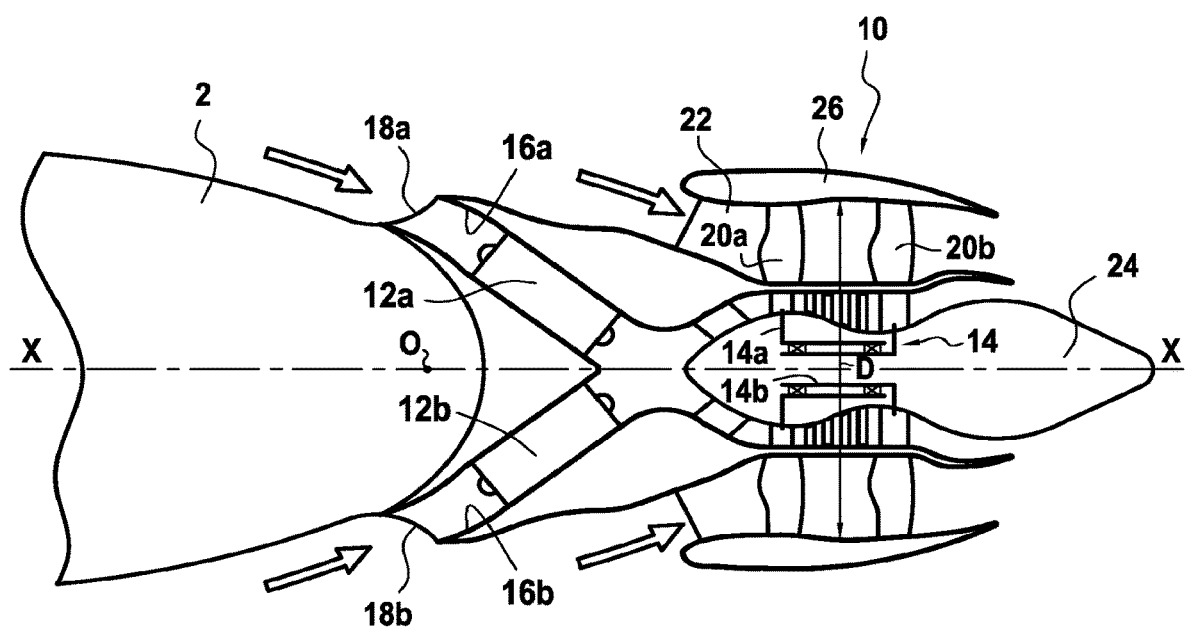
FIG. 2 is a longitudinal section view through an example turbine engine propelling the FIG. 1 airplane.

FIG. 2 shows an example of an architecture for such a turbojet 10. Reference may be made to Document WO 2014/072615, which describes such an architecture in detail, it being understood that the invention is not limited to that type of turbine engine architecture (in particular the number of fans may be other than two, for example there may be only one fan).

Typically, the turbojet 10 is centered on a longitudinal axis X-X of the fuselage 2 of the airplane and going from upstream to downstream in the gas flow direction it comprises in particular: two distinct gas generators 12a and 12b arranged in parallel and feeding a single working turbine 14. In the description below, the axis X-X is also the longitudinal axis of the turbojet.

In known manner, each gas generator 12a, 12b comprises: a low pressure compressor; a high pressure compressor; a combustion chamber; a low pressure turbine; and a high pressure turbine (not shown in the figures). Furthermore, each gas generator 12a, 12b is received inside a primary flow passage 16a, 16b. These two primary flow passages may together form a V-shape that is open upstream and that converges towards the longitudinal axis X-X.

A mixer (not shown in the figures) is positioned in the converging zone of the two primary flow passages 16a, 16b. The function of this mixer is to mix the gas streams coming from the two gas generators in order to create a single uniform gas stream for feeding to a working turbine module 14 (made up of a plurality of coaxial and contrarotating rotors).

Distinct air inlets 18a and 18b for feeding each gas generator may also be provided. These air inlets are connected to the fuselage 2 of the airplane so as to absorb at least a portion of the boundary layer formed around the fuselage of the airplane. More precisely, their inside walls are directly integrated in the fuselage of the airplane.

The working turbine 14 that is fed by the two gas generators is provided with two contrarotating turbine rotors 14a, 14b for driving two fans 20a and 20b to rotate in opposite directions, which fans are located that the rear of the turbojet and arranged in series in a secondary flow passage 22. These turbine rotors are coaxial and centered on the longitudinal axis X-X. The working turbine 14 is received inside a structure (not shown in the figures) that is situated inside the fuselage, the fuselage also supporting an annular central body of revolution 24 about the longitudinal axis X-X.

The two fans 20a and 20b are ducted by a nacelle 26 fixed directly to the vertical tail fin 4 of the airplane. By way of example, these fans have an outside diameter D that corresponds substantially to the greatest diameter of the fuselage 2 of the airplane.

In the invention, the airplane 1 also has at least one acoustic baffle forming panel 100 that is directly connected to the fuselage 2 of the airplane (in the same manner as are the wings 3 of the airplane).

The panel 100 is arranged under the turbojet 10 in a plane P (FIG. 3A) that is parallel to the longitudinal axis X-X of said turbojet (this plane P being a plane that is substantially horizontal when the airplane is on the ground). It presents an aerodynamic profile and may be fitted with systems of slats and flaps (not shown) for performing functions associated with flight mechanics (e.g. controlling the angle of incidence of the airplane).

The dimensions and the particular positioning of the panel 100 are adjusted so as to treat mainly the noise radiated upstream from the turbojet.

Figure 3A:
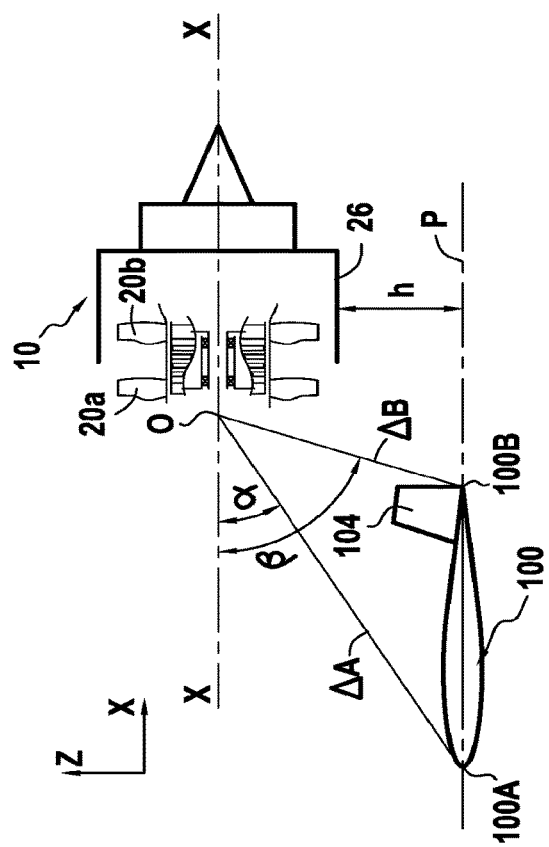
FIGS. 3A to 3C are section views of the airplane of the figure on various planes showing the dimensions and the positioning of the panel forming an acoustic baffle relative to the engine.

Thus, as shown in FIG. 3A, in a vertical section plane XZ containing the longitudinal axis X-X of the turbojet (the plane XZ is a longitudinal plane of the turbojet), the panel extends longitudinally between an upstream end 100A and a downstream end 100B.

In this vertical plane XZ, a straight line $\Delta A$ going through the upstream end 100A of the panel and through a center O for air inlet into the fan 20a, 20b of the turbojet forms an angle $\alpha$ with the longitudinal axis X-X that lies in the range 30° to 80°, and that is preferably equal to 50°. In this example, the center O is situated on the axis X-X and is positioned at the level of the air inlet section to the turbojet, at the upstream end of the nacelle 26 surrounding the fan.

Likewise, a straight line $\Delta B$ passing through the downstream end 100B of the panel and through the center O of the air inlet of the fans 20a and 20b of the turbojet forms an angle $\beta$ with the longitudinal axis X-X of the turbojet that lies in the range 60° and 130°, and that is preferably equal to 90°.

Furthermore, the distance h lying horizontally between the plane P in which the panel 100 is arranged and the nacelle 26 surrounding the fans 20a and 20b of the turbojet preferably lies in the range 0.2 times to 0.5 times the diameter D of said fans. Such a value for the distance h represents a good compromise between disturbing the flow feeding the fans of the turbojet and ensuring the panel is suitable for integrating with the fuselage of the airplane.

Figure 3B:
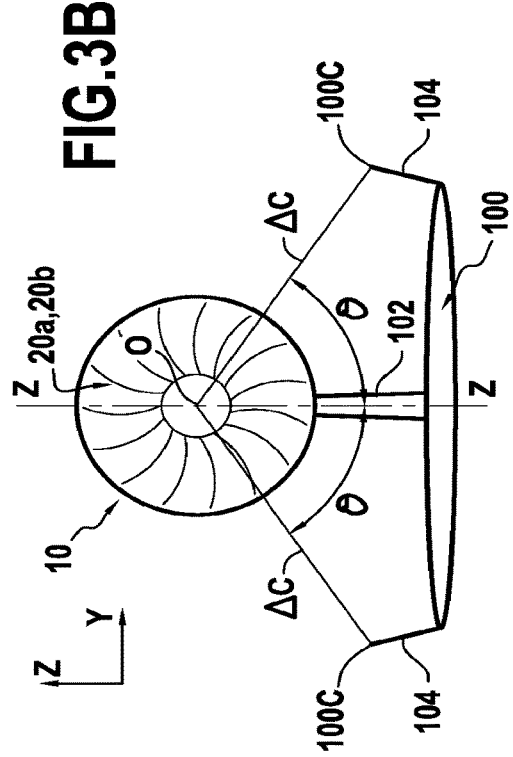

Furthermore, depending on the value for the distance h, it is possible to reinforce the structure with one or more reinforcing pylons 102 that are in the form of structural elements enabling the panel 100 to be connected to the fuselage 2 of the airplane (see FIGS. 1 and 3B).

As shown in FIG. 3B, in a vertical section plane YZ perpendicular to the plane XZ and to the longitudinal axis X-X of the turboprop (this plane YZ is a plane extending transversely relative to the turbojet), the panel 100 extends laterally between two lateral ends 100C.

In this vertical plane YZ, the straight lines ΔC passing through each of the lateral ends 100C of the panel and the center O of the fans of the turbojet form an angle θ with a vertical axis Z-Z of said turbojet that preferably lies in the range 60° to 90°. Such an angle makes it possible to optimize the action of the panel for the purpose of minimizing soundwave propagation and satisfying as well as possible the acoustic certification standards that relate to laterally radiated noise.

In order to comply with this criterion for the angle θ, while avoiding having a panel 100 that is too large laterally, the lateral ends 100C of the panel may advantageously be determined by respective winglets 104 formed integrally with the panel, these winglets being oriented so as to offset the panel towards the turbojet.

Figure 3C:
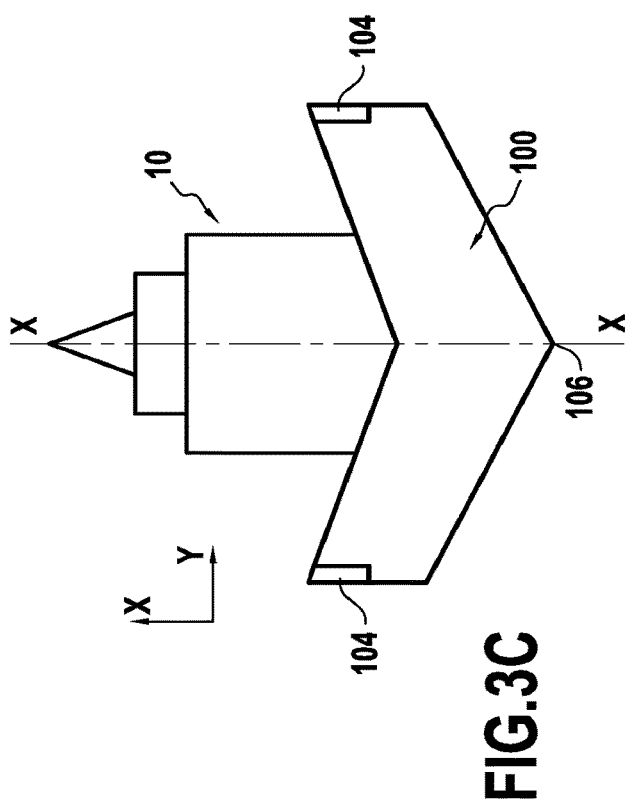

FIG. 3C shows how the panel and the turbojet are assembled in a horizontal section plane XY (this plane XY is a longitudinal plane of the turbojet). In this horizontal plane XY, the panel 100 advantageously presents a shape that is symmetrical relative to the longitudinal axis X-X of the turboprop 10 (i.e. the panel is of a shape that is symmetrical relative to the vertical plane XZ).

Under such circumstances, the panel 100 may present a profile that is pointed, with its tip 106 lying in line with the longitudinal axis X-X of the turboprop so as to give the panel 100 a profile that is aerodynamic.

Likewise, in the vertical plane XZ of FIG. 3A, the right section of the panel 100 is advantageously similar to that of an airplane wing and its lift can be adapted to the needs of flight mechanics.

Furthermore, the structure of the panel and the materials used for making it are advantageously suitable for reflecting soundwaves. For example, the material used may be aluminum, a light composite material (of the type comprising glass or carbon fibers impregnated with a resin, etc.), or a combination of such materials. In general manner, the material needs to possess very little porosity so as to constitute an obstacle to the propagation of soundwaves and so as to have good mechanical strength (for safety reasons). In addition, the outside surface of the panel is made so as to minimize friction forces.

It should be observed that with the presence of such a panel forming an acoustic baffle, the airplane of the invention advantageously need not have a canard foil. Certain airplanes may have two lift surfaces, a canard foil at the front, that generally provides lift, and a main wing placed behind it. The canard foil surface normally produces lift that is positive (upward lift) that is additional to the lift produced by the main wing. With an airplane having the architecture of the invention, the canard foil is no longer necessary, since its positive lift function is provided by the acoustic baffle forming panel.

It should also be observed that the above-described panel may be made up of a plurality of panels. For example, when a fuselage is very close to the air inlet of the turbojet, it is possible to have recourse to a plurality of panels in a staircase configuration so as to take account of the space occupied by the fuselage. Under such circumstances, the parameters for dimensioning such multiple panels are the same as those described above for a single panel.

It should also be observed that the panel (or panels) need not necessarily be plane as described above. In particular, it is possible to have recourse to a panel that is curved or to a plurality of panels that are not contained in a common horizontal plane (but for example form a V-shape). It is also possible to have recourse to a panel made up of a plurality of profiles of chords that are parallel to the longitudinal axis of the turbojet (where the chord of a profile is defined as the straight line connecting together the leading edge and the trailing edge of the profile).

The invention claimed is:

1. An airplane comprising:
a turbine engine having a fan, the turbine engine being integrated in a rear of a fuselage of the airplane, extending the fuselage rearwards; and
an acoustic baffle forming panel connected to the fuselage of the airplane and arranged below the turbine engine in a plane that is parallel to a center longitudinal axis of the turbine engine,
wherein in a vertical plane containing the center longitudinal axis of the turbine engine, the panel extends longitudinally between an upstream end and a downstream end, a first straight line passing through the upstream end of the panel and a center of an air inlet of the fan of the turbine engine forming first angle with the center longitudinal axis of the turbine engine that lies in a range of 30° to 80°, and a second straight line passing through the downstream end of the panel and the center of the air inlet of the fan of the turbine engine forming a second angle with the center longitudinal axis of the turbine engine lying in a range of 60° to 130°, the upstream end and the downstream end of the panel both being disposed upstream of the center of the air inlet of the fan of the turbine engine.

2. The airplane according to claim 1, wherein the first angle formed between the first straight line passing through the upstream end of the panel and the center of the air inlet of the fan of the turbine engine is 50°, and the second angle formed between the second straight line passing through the downstream end of the panel and the center of the air inlet of the fan of the turbine engine is 90°.

3. The airplane according to claim 1, wherein a distance lying vertically between a plane in which the panel is arranged and a nacelle surrounding the fan of the turbine engine lies in a range of 0.2 times to 0.5 times a diameter of the fan of the turbine engine.

4. The airplane according to claim 1, wherein, in a plane that is substantially vertical and substantially perpendicular to the center longitudinal axis of the turbine engine, the panel extends laterally between first and second lateral ends, a third straight line passing through the first lateral end of the panel and the center of the air inlet of the fan of the turbine engine and a fourth straight line passing through the second lateral end of the panel and the center of the air inlet of the fan of the turbine engine each forming an angle with an axis substantially perpendicular to the center longitudinal axis of the turbine engine that lies in a range of 60° to 90°.

5. The airplane according to claim 4, wherein each of the first and second lateral ends of the panel is terminated by a respective winglet, the winglets being oriented so as to offset the panel towards the turbine engine.

6. The airplane according to claim 1, wherein the panel presents a shape that is symmetrical relative to a substantially vertical plane containing the center longitudinal axis of the turbine engine.

7. The airplane according to claim 6, wherein the panel presents a pointed profile with a tip positioned extending along the center longitudinal axis of the turbine engine.

8. The airplane according to claim 1, wherein, in a substantially vertical plane that is substantially perpendicular to the center longitudinal axis, the panel presents a cross section in a form of an airplane wing.

9. The airplane according to claim 1, wherein a front of said airplane does not have a canard foil.

* * * * *